Dec. 23, 1930.  P. SCHMIDT ET AL  1,786,090
APPARATUS FOR BLOOD TRANSFUSION
Original Filed Aug. 3, 1928
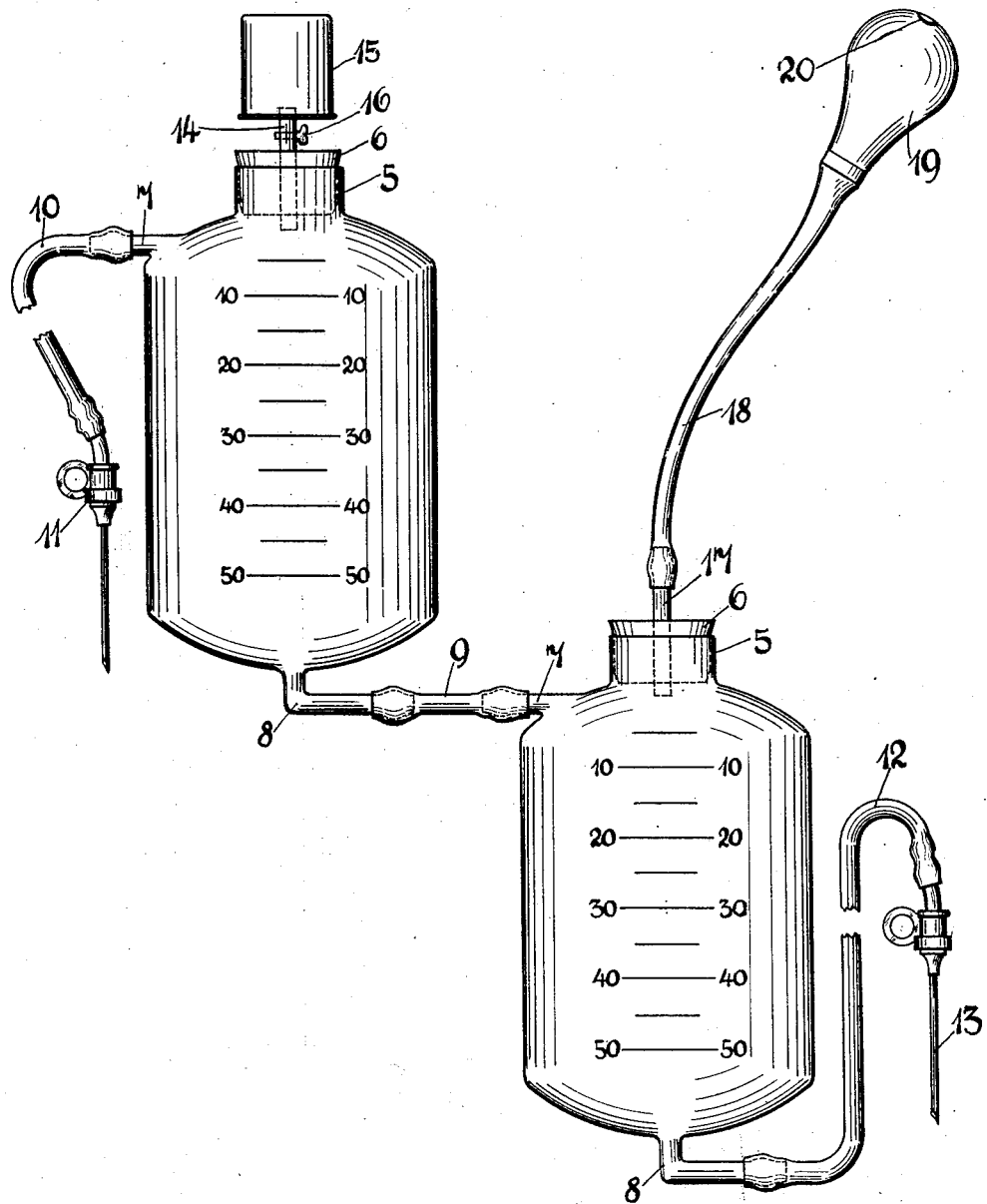
Paul Schmidt.
Francis V. Malloy
INVENTORS.
BY Erich P. Michaelis
ATTORNEY.

Patented Dec. 23, 1930

1,786,090

UNITED STATES PATENT OFFICE

PAUL SCHMIDT AND FRANCIS V. MALLOY, OF CHICAGO, ILLINOIS

APPARATUS FOR BLOOD TRANSFUSION

Application filed August 3, 1928, Serial No. 297,282. Renewed October 22, 1930.

The invention relates to apparatus for blood transfusion and the object of the invention is to provide an apparatus of that type consisting mainly of two containers, one of which is adapted to receive blood directly from the donor, while the other vessel is adapted to receive the blood from said first mentioned container and to be put under pressure in order to force said blood into the veins of the recipient.

Other objects of the invention not specifically mentioned will be easily understood and ascertained from the following description in connection with the accompanying drawings forming a part thereof. It is however to be noted that the invention is not to be limited or restricted to the exact construction or formation shown in the drawings and described in the specification, but that said invention is only to be limited by the scope of the claim appended hereto.

The drawing illustrates a preferred embodiment of the invention.

The apparatus for blood transfusion according to the present invention consists mainly of two vessels or containers. Said two vessels being formed and constructed exactly alike it will suffice to describe one of them. Preferably the vessels are made from glass of the type known under the trade name "Pyrex". It is however to be understood, that said vessels may be made from any other suitable material.

Each vessel has a short neck 5 on its upper part with an opening therein communicating with the interior of the vessel and adapted to receive a stopper 6 or the like to hermetically close said opening.

At the upper edge at one side a tube like protuberance 7 extends horizontally from the vessel and said tube communicates also with the interior of the vessel.

From the center of the bottom of the vessel a tube 8 extends downwardly for a short distance and then horizontally in a direction opposite to the first mentioned tube 7. The bottom of said vessel is preferably formed so that it will drain into the tube 8. To use said two vessels to transfer blood from the donor to the recipient, the vessels are supported by means of a suitable stand or the like. Since the supporting means do not form any part or portion of the present invention said means are not shown in the drawing. The vessels are arranged on said supporting means in such a manner, that the horizontal tube 7 of one of the vessels and the bottom tube 8 of the other are positioned at substantially the same level. The two vessels are then connected with each other by means of a rubber tube 9 or the like, which will be attached to the two tubes 7 and 8 as shown in the drawing. A rubber tube 10 is attached to the upper tube 7 of the vessel arranged at the higher level and a syringe needle 11 is connected to said rubber tube. Said needle may be of any known and suitable type. A similar rubber tube 12 and syringe needle 13 is attached to the bottom tube 8 of the lower vessel.

Each stopper 6 is provided with a central longitudinal bore. In the bore of the stopper of the upper vessel a glass tube 14 or the like is inserted, which carries at its upper end a container 15 adapted to receive citrate or a saline solution. A stop cock 16 is arranged in the tube 14 to regulate the flow of the liquid in said container into the upper vessel.

In the bore of the stopper of the lower vessel another glass tube 17 is inserted, to which a rubber tube 18 is attached ending in a bulb 19. This bulb is provided with a check valve 20 similar to bulbs used in connection with vaporizers and the like.

The apparatus is used in the following manner:

The upper syringe needle is inserted into the vein of the donor, so that the blood of said donor will flow into the upper vessel and from there into the lower vessel. When the lower vessel is filled to a desired degree, the rubber tube connecting the two vessels with each other is compressed by means of a clamp or the like (not shown), so that the blood flowing from the donor will now be collected in the upper vessel. In order to prevent this blood from coagulating the stop cock 16 is opened to permit a certain amount of citrate to enter into the upper vessel.

The syringe needle of the lower vessel has in the meantime been inserted into the vein of the recipient and the blood in the lower vessel is forced into said veins by creating a pressure in the lower vessel by pumping air into said vessel by means of the bulb 19.

When the blood in the lower vessel has been forced therefrom, the rubber tube 9 is opened again, so that the blood may flow again from the upper vessel into the lower one. These steps may be repeated as often as necessary.

What we claim as new and desire to secure by Letters Patent is:

In a device of the class described a pair of vessels, each vessel having a central opening in its top, an intake tube at the upper end of each vessel an outlet tube in the bottom of each vessel, the two vessels arranged at different levels, the outlet tube of one of said vessels being approximately at the same level with the intake tube of the other vessel, means for connecting said outlet tube with said intake tube, means communicating with the interior of the lower vessel through the central opening therein for creating a pressure in said vessel, a stopper for the central opening in the upper vessel, a tube extending through said stopper into said vessel, and a container supported by the upper end of said tube and being in communication with the interior of said tube.

In witness whereof we affix our signatures.

PAUL SCHMIDT.
FRANCIS V. MALLOY.